Jan. 27, 1931.  A. ENGELS  1,790,043
PROCESS AND CONTRIVANCE FOR THE MANUFACTURE OF WIRE GLASS
PLATES WITH WIRES RUNNING IN ONE DIRECTION
Filed July 15, 1929
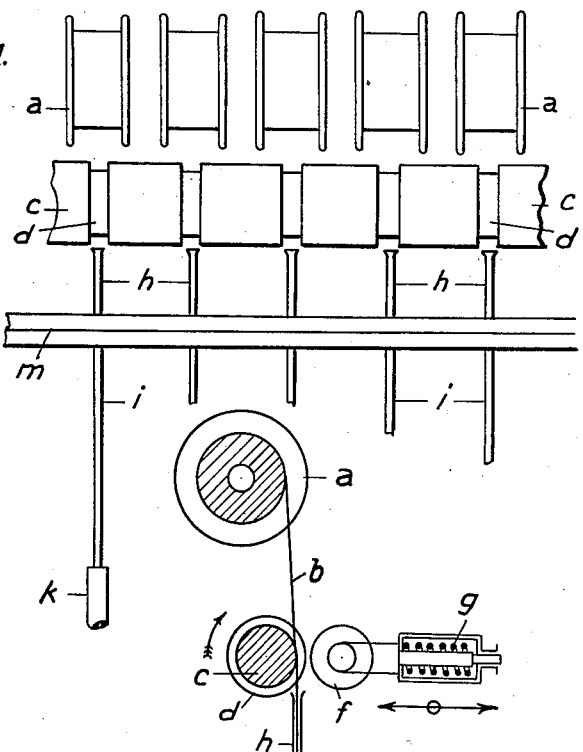
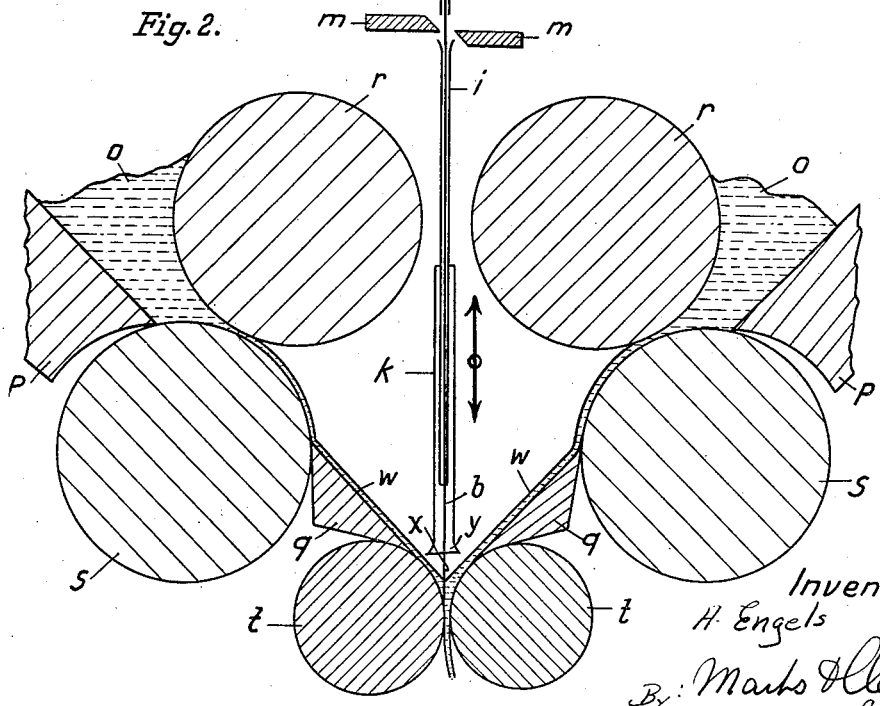
Inventor:
H. Engels Patented Jan. 27, 1931

1,790,043

UNITED STATES PATENT OFFICE

ADOLF ENGELS, OF ALTWASSER, GERMANY, ASSIGNOR TO SCHLESISCHE SPIEGELGLAS-MANUFACTUR CARL TIELSCH, G. M. B. H., OF WALDENBURG-ALTWASSER, GERMANY

PROCESS AND CONTRIVANCE FOR THE MANUFACTURE OF WIRE-GLASS PLATES WITH WIRES RUNNING IN ONE DIRECTION

Application filed July 15, 1929, Serial No. 378,466, and in Germany August 7, 1928.

The present invention relates to a process for the manufacture of wire-glass-plates with wires running in one direction and a contrivance for the carrying out of this process.

In the known process for the manufacture of such wire-glass-plates, a quantity of glass was poured on an even cast iron table in front of a rolling-apparatus, the table containing also the wire spools. This rolling-apparatus rolls out the glass-metal into a plate, during which action the wires coming from the spools are pressed into the glass. The drawback of this process is, that the wires are not getting into the middle of the ready glass plates. Another disadvantage of this process is the impossibility of placing the wires exactly parallel into the plates.

According to the present invention these drawbacks are done away with by means of two layers of glass being first rolled out in a duplex rolling machine and parallel metal wires being placed between the said rolled glass layers and conducted, by means of a special apparatus, to the amalgamating line of the two glass layers. This way of manufacturing wire-glass-plates enables to place the wires exactly in the middle of the glass plates insuring at the same time a perfectly parallel position of the wires in the plates.

The accompanying drawing gives an example of the contrivance for carrying out this new process, i. e.

Fig. 1 is a schematic view of the wire conducting arrangement.

Fig. 2 is a vertical section of the wire conducting arrangement in connection with the duplex glass rolling machine.

a are the metal spools containing the wires b. From these spools a the wires b are passing to a clutch-roller c which is provided with rectangular recesses d for guiding the wires and which can be turned by means of a hand-wheel or other arrangement. Pressure rollers f which are acted on by springs g, are engaging into the recesses d of the clutch-roller.

For the purpose of threading the wires, the pressure rollers can be brought near to the clutch-roller or moved away from it as may be required. From the clutch-roller c the wires are passing into a system of parallel tubes h and from there into parallel tubes i and k telescoped into each other. Between the tubes h and i, cutters m are arranged for cutting all the wires simultaneously. The cutters may be worked in any convenient manner. From the tubes i and k the wires b, guided exactly parallel, are passing to the amalgamating-line x of the two glass layers w brought on by the duplex glass rolling machine.

As shown by Fig. 2, the glass metals o are on tables p at both sides of the tubes i, k and are getting rolled out by rollers r, s into plates w. The latter are passing over tables q between rollers t. Here the wires b are entering in correct parallel position exactly into the middle between the two glass layers w, where they are rolled into the glass plates. The ends y of the telescoped tubes i, k can be adjusted to the amalgamating-line x of the glass layers as desired. In this way the wires are given a perfectly parallel position and will always be situated exactly in the middle of the glass plates.

Claims:

1. A device for feeding separate strands of wire simultaneously to the amalgamating point of two layers of glass in a duplex rolling machine, including in combination wire carrying rolls, a clutch roller provided with a series of recesses corresponding to the number of rolls and about which wires are arranged a series of guiding tubes for conducting the wires to the amalgamating point of the duplex rolling machine, and resilient pressure rollers engaging in the recesses of the clutch roller.

2. A device according to claim 1, wherein the resilient pressure rollers are arranged so that they may be brought out of engagement with the clutch roller for the purpose of threading the wires.

3. A device according to claim 1, wherein the guiding tubes are constructed in telescopic formation so that the outlets for the wires may be adjusted opposite the amalgamating point of both glass layers of the rolling machine.

In testimony whereof I have signed my name to this specification.

ADOLF ENGELS.